(12) United States Patent
Gururangan et al.

(10) Patent No.: US 7,177,111 B2
(45) Date of Patent: Feb. 13, 2007

(54) SYSTEM AND METHOD FOR OPTIMIZING TRACK SPACING ACROSS A STROKE

(75) Inventors: Raghu Gururangan, Pleasanton, CA (US); Fernando A. Zayas, Loveland, CO (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 63 days.

(21) Appl. No.: 11/027,730

(22) Filed: Dec. 30, 2004

(65) Prior Publication Data

US 2005/0152060 A1    Jul. 14, 2005

Related U.S. Application Data

(60) Provisional application No. 60/533,292, filed on Dec. 30, 2003, provisional application No. 60/533,454, filed on Dec. 30, 2003.

(51) Int. Cl.
*G11B 21/02* (2006.01)
*G11B 5/596* (2006.01)

(52) U.S. Cl. .................... 360/75; 360/78.04
(58) Field of Classification Search ............ None
See application file for complete search history.

(56) References Cited

U.S. PATENT DOCUMENTS

| | | | |
|---|---|---|---|
| 5,189,571 A | 2/1993 | Murphy et al. | 360/75 |
| 6,005,725 A | 12/1999 | Emo et al. | 360/31 |
| 6,304,407 B1 | 10/2001 | Baker et al. | 360/75 |
| 6,437,935 B1 * | 8/2002 | Johnson et al. | 360/75 |
| 6,633,451 B1 | 10/2003 | Chainer et al. | 360/75 |
| 6,738,205 B1 | 5/2004 | Moran et al. | 360/17 |
| 6,940,679 B1 * | 9/2005 | McNeil et al. | 360/77.04 |
| 6,946,854 B2 * | 9/2005 | Zayas et al. | 324/691 |
| 2005/0275963 A1 | 12/2005 | Ehrlich | |

FOREIGN PATENT DOCUMENTS

JP        2003-374515    *    4/2003    ............ 360/31

\* cited by examiner

*Primary Examiner*—Wayne Young
*Assistant Examiner*—Jason Olson
(74) *Attorney, Agent, or Firm*—Fliesler Meyer LLP

(57) ABSTRACT

Systems and methods in accordance with embodiments of the present invention can be applied to determine the position of a ramp relative to an actuator. In one embodiment, a system in accordance with the present invention includes a rotatable medium having a first track assigned to a track located a distance from the ramp, rather than a distance from an average acquire track, thereby maximizing the size of a data region. A track density can be reduced for a given hard disk drive capacity, or alternatively the hard disk drive capacity can be maximized for a given track density.

27 Claims, 9 Drawing Sheets

SYSTEM AND METHOD FOR OPTIMIZING TRACK SPACING ACROSS A STROKE

CLAIM OF PRIORITY

This application claims priority to U.S. Provisional Patent Application No. 60/533,292 entitled "Method for Optimizing Track Spacing Across a Stroke" by Raghu Gururangan and Fernando Zayas, filed Dec. 30, 2003, and U.S. Provisional Patent Application No. 60/533,454 entitled "System for Optimizing Track Spacing Across a Stroke" by Raghu Gururangan and Fernando Zayas, filed Dec. 30, 2003, both incorporated herein by reference.

TECHNICAL FIELD

The present invention relates to rotatable media data storage devices, as for example optical or magnetic hard disk drive technology.

BACKGROUND

A hard disk drive typically contains one or more disks clamped to a rotatable spindle motor, at least one head for reading data from and/or writing data to the surfaces of each disk, and an actuator utilizing linear or rotary motion for positioning the head(s) over selected data tracks on the disk(s). The actuator positions the read/write head over the surface of the disk as the spindle motor rotates and spins the disk.

As the head is loaded onto a disk, for example from a ramp, the servo system determines the position of the head on the disk surface by reading servo wedges passing beneath the head. A first track identified by the servo system as the head loads from the ramp is identified as an acquire track. A first user track can be assigned based on the position of the acquire track, and can define an outer boundary of a data region. The acquire track is some small distance from the ramp, and farther from the outer diameter of the disk than is optimal or desired, wasting otherwise usable space and requiring an increased track density for a given hard disk drive capacity.

BRIEF DESCRIPTION OF THE FIGURES

Further details of embodiments of the present invention are explained with the help of the attached drawings in which.

DETAILED DESCRIPTION

Figure 1:
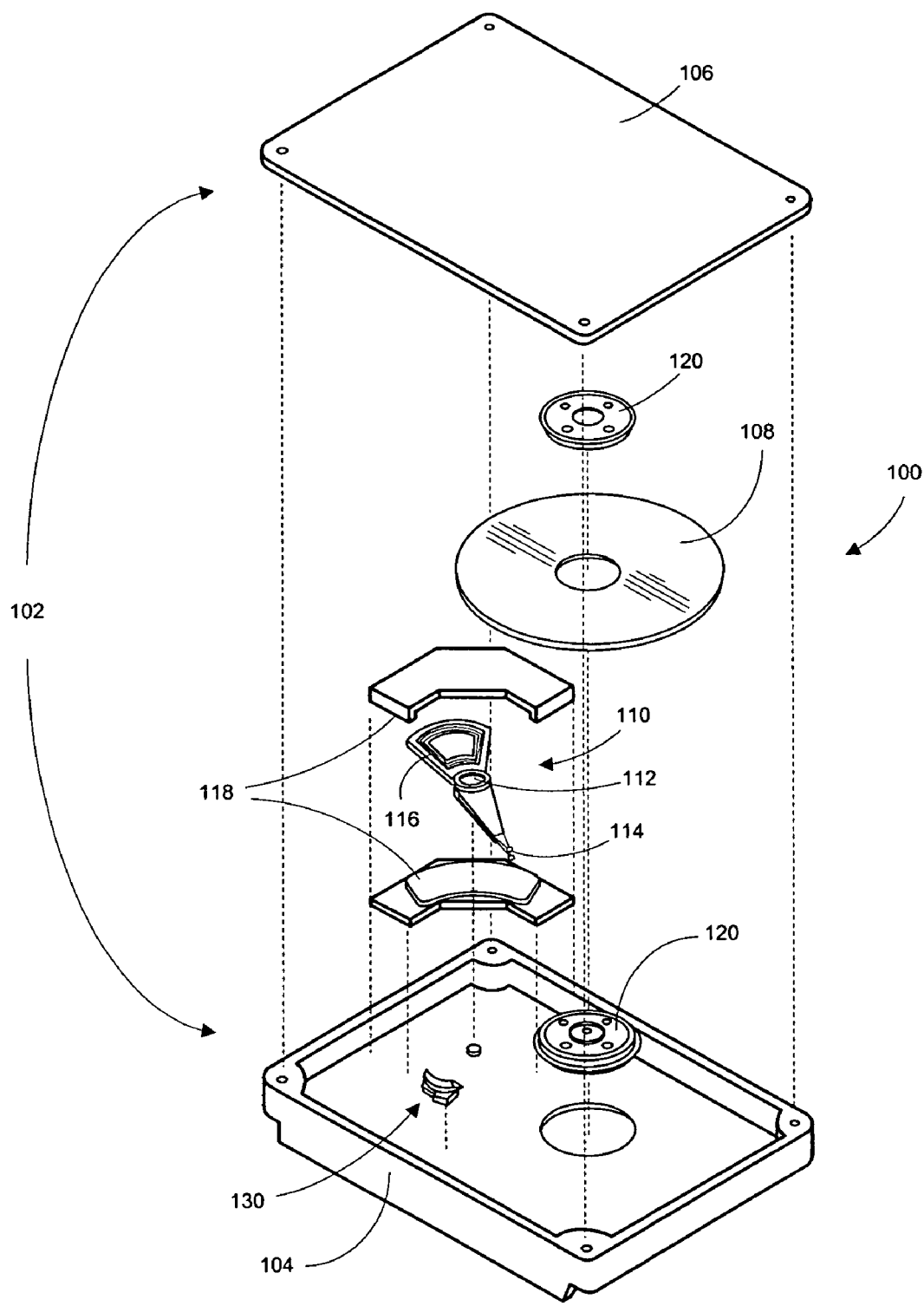
FIG. 1 is a partial exploded view of an exemplary hard disk drive for applying a spindle motor and method in accordance with one embodiment of the present invention.

FIG. 1 is an exploded view of an exemplary hard disk drive 100 for applying a method in accordance with one embodiment of the present invention. The hard disk drive 100 includes a housing 102 comprising a housing base 104 and a housing cover 106. The housing base 104 illustrated is a base casting, but in other embodiments a housing base 104 can comprise separate components assembled prior to, or during assembly of the hard disk drive 100. A disk 108 is attached to a rotatable spindle motor 120, for example by clamping, and the spindle motor 120 is connected with the housing base 104. The disk 108 can be made of a light aluminum alloy, ceramic/glass or other suitable substrate, with magnetizable material deposited on one or both sides of the disk 108. The magnetic layer has tiny domains of magnetization for storing data transferred through heads 114. In one embodiment, each head 114 is a magnetic transducer adapted to read data from and write data to the disk 108. The disk 108 can be rotated at a constant or varying rate typically ranging from less than 3,600 to more than 15,000 RPM (speeds of 4,200 and 5,400 RPM are common in hard disk drives designed for mobile devices such as laptop computers). The invention described herein is equally applicable to technologies using other media, as for example, optical media. Further, the invention described herein is equally applicable to devices having any number of disks attached to the spindle motor 120. In other embodiments, the head 114 includes a separate read element and write element. For example, the separate read element can be a magneto-resistive head, also known as a MR head. It will be understood that multiple head 114 configurations can be used.

A rotary actuator 110 is pivotally mounted to the housing base 104 by a bearing 112 and sweeps an arc between an inner diameter (ID) of the disk 108 and a ramp 130 positioned near an outer diameter (OD) of the disk 108. Attached to the housing 104 are upper and lower magnet return plates 118 and at least one magnet that together form the stationary portion of a voice coil motor (VCM). A voice coil 116 is mounted to the rotary actuator 110 and positioned in an air gap of the VCM. The rotary actuator 110 pivots about the bearing 112 when current is passed through the voice coil 116 and pivots in an opposite direction when the current is reversed, allowing for precise positioning of the head 114 along the radius of the disk 108. Each side of a disk 108 can have an associated head 114, and the heads 114 are collectively coupled to the rotary actuator 110 such that the heads 114 pivot in unison. The invention described herein is equally applicable to devices wherein the individual heads separately move some small distance relative to the actuator. This technology is referred to as dual-stage actuation (DSA).

Figure 2:
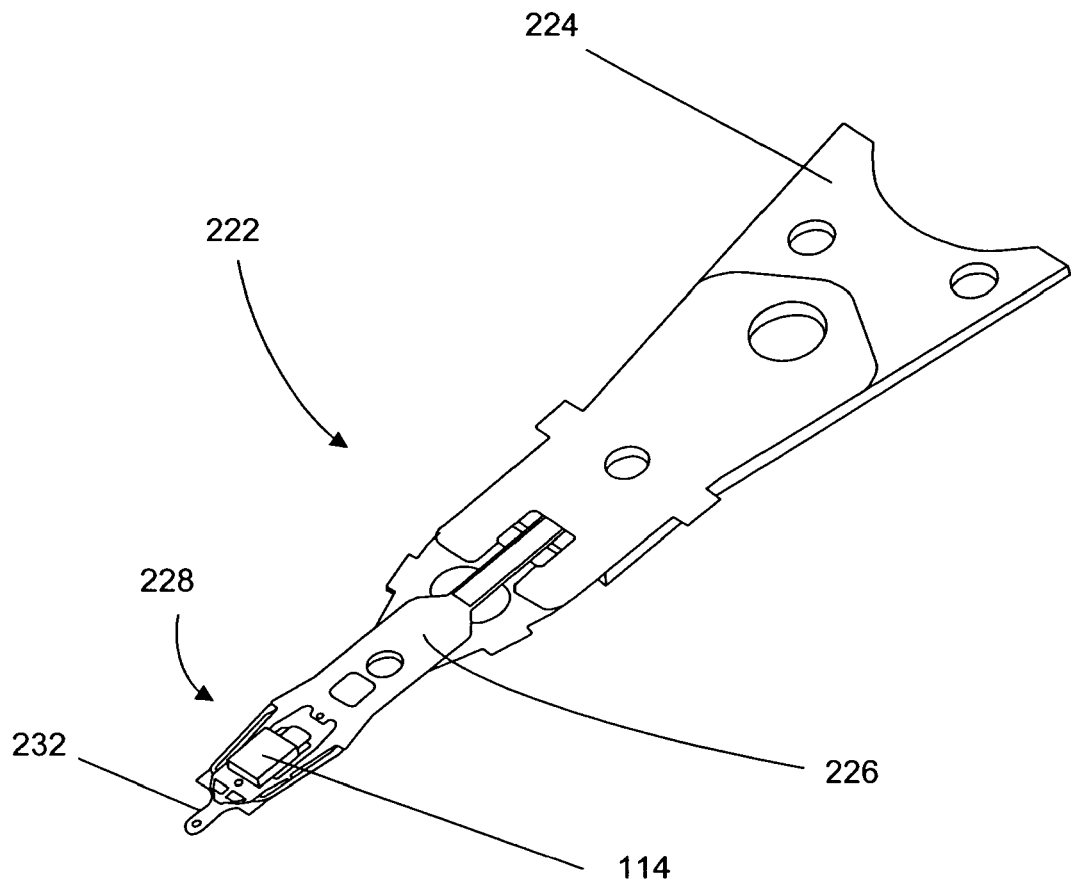
FIG. 2 is a close-up view of a head suspension assembly used in the hard disk drive of FIG. 1, showing head, slider and suspension.

FIG. 2 details an example of a subassembly commonly referred to as a head suspension assembly (HSA) 222 comprising the head 114 formed on a slider 228, which is further connected with a flexible suspension member (a suspension) 226. The suspension 226 can be connected with an arm 224 which in one embodiment can be either integrally formed with a mount for a bearing 112 or separately attached to the mount. The head 114 can be formed on the slider 228 using a number of different techniques, for example the head 114 and slider 228 can be manufactured on a single die using semiconductor processing (e.g. photolithography and reactive ion etching). Spinning of the disk(s) 120 increases air pressure beneath the slider 228, creating a thin air bearing that lifts the slider 228 (and consequently the head 114) off of the surface of the disk 108. A micro-gap of typically less than one micro-inch can be maintained between the disk 108 and the head 114 in one embodiment. The suspension 226 can be bent or shaped to act as a spring such that a force is applied toward the disk 108 surface. The air bearing resists the spring force applied by the suspension 226, and the opposition of the spring force and the air bearing to one another allows the head 114 to trace the surface contour of the rotating disk 108 (which is likely to have minute warpage) without "crashing" against the disk 108 surface. As is well understood by those of ordinary skill in the art, not all heads ride an air bearing as described above. When a head 114 "crashes," the head 114 collides with the disk 108 surface such that the head 114 and/or the disk 108 surface may be damaged.

Refinements in disk fabrication have enabled manufacturers to produce disks 108 having ultra-smooth surfaces. Use of a disk 108 having an ultra-smooth surface can introduce a potential failure mechanism wherein electrostatic forces between the slider 228 and the ultra-smooth surface can cause the slider 228 to stick to the surface. If the speed of rotation of the disk 108 slows such that the air bearing between the slider 228 and disk 108 collapses, the slider 228 can contact and stick to the surface of the disk 108, causing catastrophic failure of the hard disk drive 100. For example, sticking can cause the disk 108 to abruptly lock in position or sticking can cause the slider 228 to be forcibly disconnected from the suspension 226. Thus, when the hard disk drive 100 is not in use and rotation of the disks 108 is slowed and stopped (i.e., the disks 108 are "spun down"), the heads 114 can be removed from close proximity to the disk 108 surface by positioning the suspension 226 on a ramp 130 located either adjacent to the disk 108 or just over the disk 108 surface.

Figure 3:
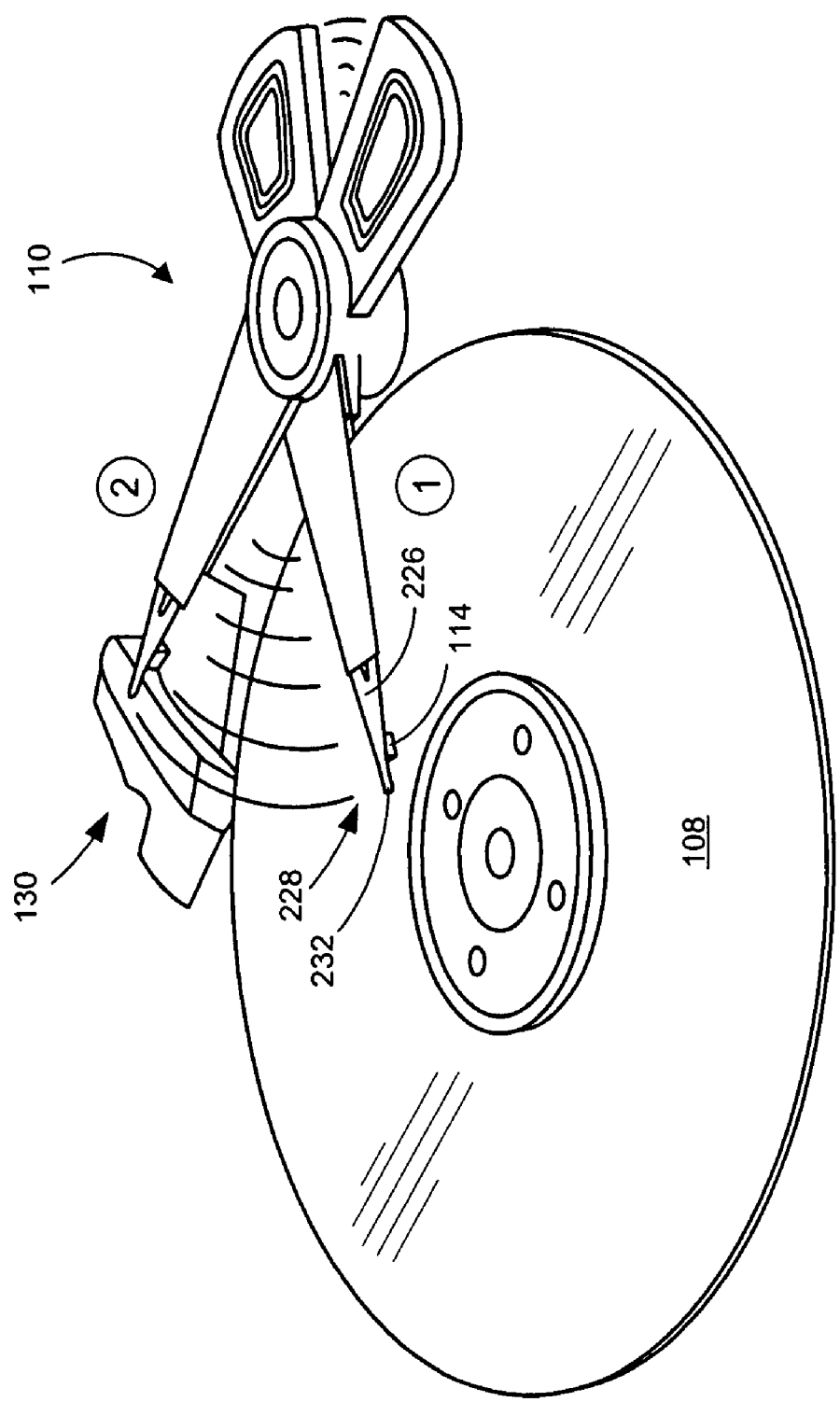
FIG. 3 is a perspective view of the motion of the rotary actuator of FIG. 1 unloading the head from the disk.

The slider 228 should be unloaded from the disk 108 before the air bearing between the slider 228 and the disk 108 collapses. FIG. 3 illustrates motion of the actuator 110 as the slider 228 is unloaded from the disk 108 and as the suspension 226 is driven up the ramp 130. The actuator 110 pivots from location 1, where the slider 228 is positioned over the disk 108 surface, to location 2, where the slider 228 is positioned adjacent to the disk 108. The range of motion of the actuator 130 is commonly referred to as a stroke. The slider 228 is removed from close proximity with the disk 108 by pivoting the actuator 110 such that a lift tab 232 extending from the suspension 226 contacts the ramp surface and slides up the ramp 130. The position along the ramp 130 where the lift tab 232 first contacts the ramp 130 can be called the touch-point. As the lift tab (also referred to herein as a tip tab) 232 slides up the ramp 130 from the touch-point, the ramp 130 opposes the spring force of the suspension 226 and forces the slider 228 (and the head 114) away from the disk 108 surface. The HSA 222 can continue its motion along the stroke by traveling up the grade portion of the ramp 130 to a substantially flat portion that optionally can include a detent for cradling the lift tab 232. The head 114 can be loaded back onto the disk 108 after the disk 108 spins up to a safe speed. In other embodiments, the suspension 226 contacts the ramp 130 at a location along the suspension 226 between the head 114 and the pivot point. Unloading the head 114 from the disk 108 prevents sticking, and further provides resistance to damage from non-operating shock by suspending the head 114 over a significantly wide gap between the head 114 and an opposing head or surface, rather than placing the head 114 in close proximity to the rigid disk 108 surface.

Figure 4:
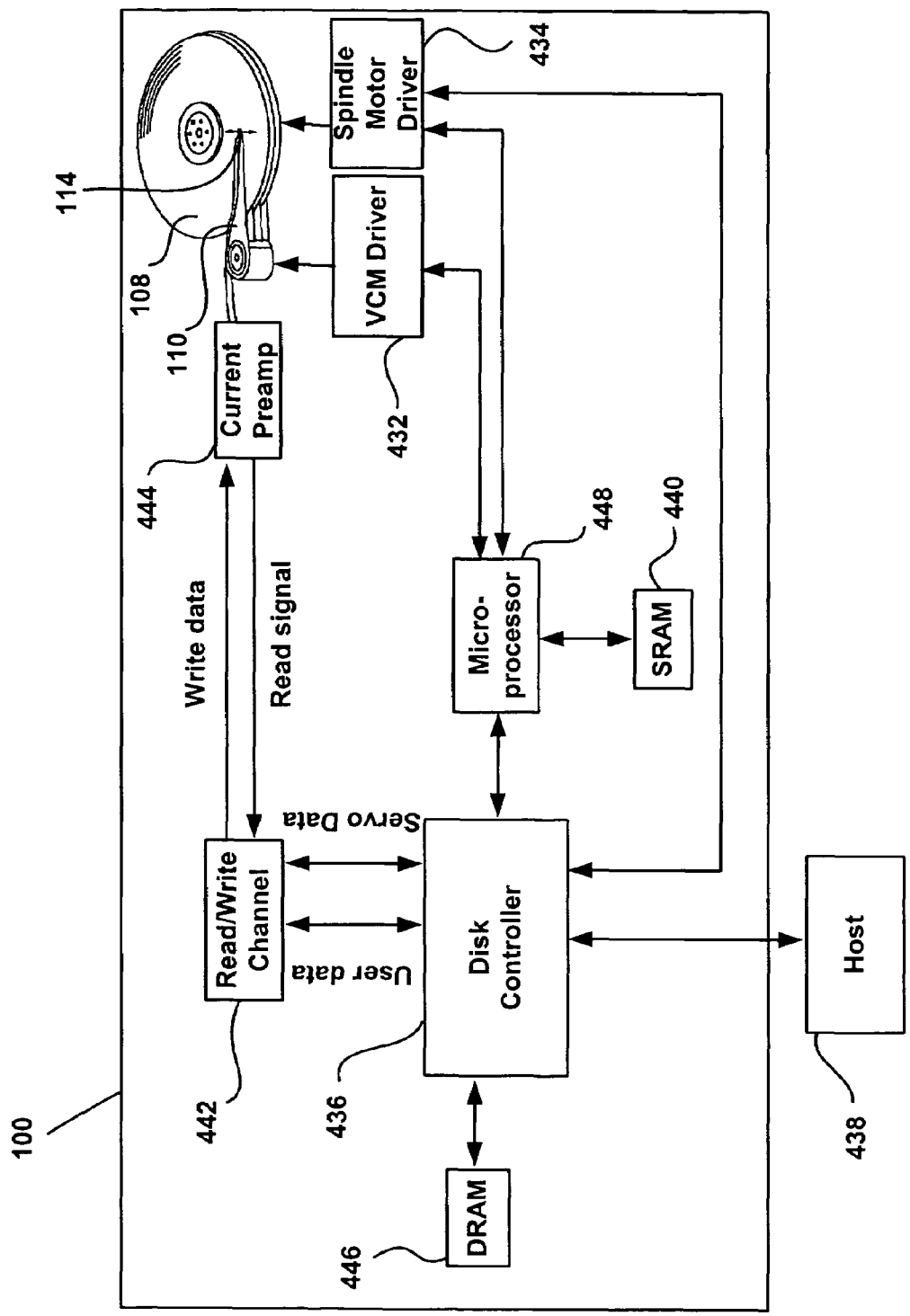
FIG. 4 is a control schematic of a typical hard disk drive for applying a method in accordance with one embodiment of the present invention.

FIG. 4 is a control schematic for the exemplary hard disk drive 100. A servo system for positioning the head 114 can comprise a microprocessor 448 and a servo controller which can exist as circuitry within the hard disk drive 100 or as an algorithm resident in the microprocessor 448, or as a combination thereof. In other embodiments, an independent servo controller can be used. The servo system uses positioning data read by the head 114 from the disk 108 to determine the position of the head 114 over tracks on the disk 108. When the servo system receives a command to position a head 114 over a track, the servo system determines an appropriate current to drive and commands a VCM driver 432 electrically connected with the voice coil 116 to drive the current through the voice coil 116. The servo system can further include a spindle motor driver 434 to drive current through the spindle motor 120 and rotate the disk(s) 108, and a disk controller 436 for receiving information from a host 438 and for controlling multiple disk functions. The host 438 can be any device, apparatus, or system capable of utilizing the hard disk drive 100, such as a personal computer, cellular phone or Web server. An interface controller can be included for communicating with the host 438, or the interface controller can be including in the disk controller 436. In other embodiments, the servo controller, VCM driver 432, and spindle motor driver 434 can be integrated into a single application specific integrated circuit (ASIC). One of ordinary skill in the art can appreciate the different means for controlling the spindle motor 120 and the VCM.

The disk controller 436 provides user data to a read/write channel 442, which sends signals to a current amplifier or preamp 444 to be written to the disk(s) 108. The disk controller 436 can also send servo signals to the microprocessor 448. The disk controller 436 can include a memory controller for interfacing with buffer memory 446. In an embodiment, the buffer memory 446 can be DRAM. The microprocessor 448 can include integrated memory (such as cache memory), or the microprocessor 448 can be electrically connected with external memory (for example, static random access memory (SRAM) 440 or alternatively dynamic random access memory (DRAM)).

Figure 5:
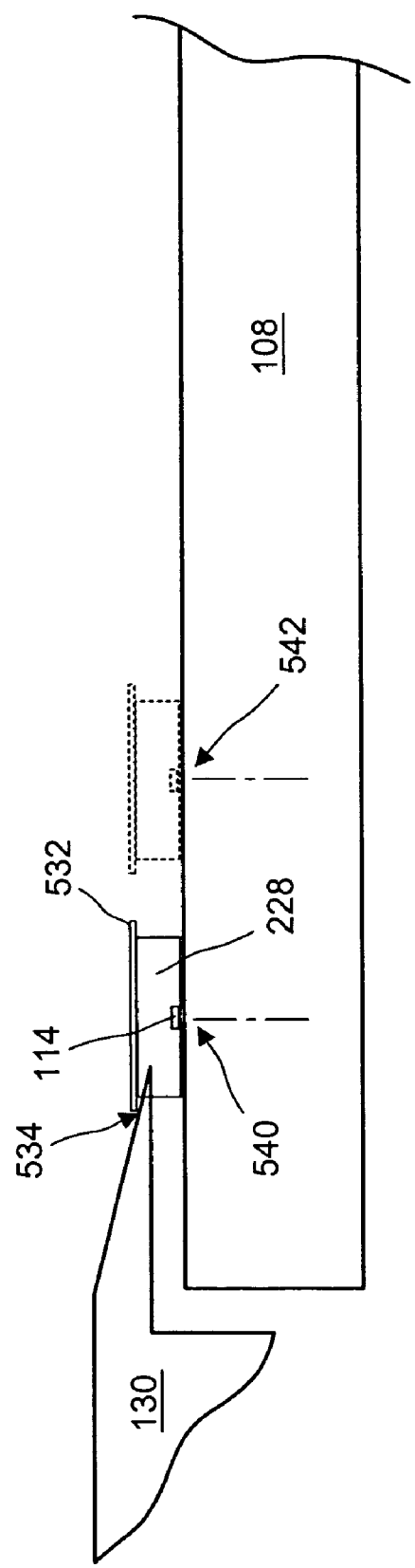
FIG. 5 is a side view of the head suspension assembly as the head is loaded onto the disk from the ramp.

Referring to FIG. 5, as a slider 228 is loaded onto a disk 108 from a ramp 130, the slider 228 can contact the disk 108 surface, possibly damaging one or both of the disk 108 surface and the slider 228. The head 114 initially determines its position on the disk 108 surface by reading servo wedges passing beneath the head 114. Servo wedges read by the head 114 identify an acquire track 540. Ideally, a touch-point 534 is positioned in close proximity to an acquire track 540 so that a maximum amount of the stroke can be used for user data. However, more likely an acquire track 540 is some small distance from the ramp 130, and farther from the OD than is optimal or desired.

Eccentricity of the disk 108 can cause variation in a distance of an acquire track 540 from the ramp 130 as the disk 108 rotates. For example, where the ramp 130 is a minimum distance from the OD when the head 114 is loaded onto the disk 108, the acquire track 540 can be assumed to be track 0. Where the ramp 130 is a maximum distance from the OD when the head 114 is loaded onto the disk 108, the acquire track 540 can be a track located nearer the ID, for example the track can be located at track 1000 relative to track 0. The drift between track 0 and 1000 can be an indication of disk eccentricity. As the disk 108 rotates, the head 114 will move an undesirable distance from the ramp 130, and the portion of the disk 108 surface usable as a data region is not optimized.

Alternatively, variation between the maximum and minimum distance between the ramp 130 and the acquire track 540 can be attributed to one or both of sampling error and load velocity. For example, in one such technique for assigning an acquire track 540, ten consecutive acceptable servo wedges must be measured before a track number is recorded as an acquire track 540. Further, as the head 114 is loaded onto the disk 108, the head 114 can enter the perimeter of the track just as a servo wedge is passing adjacent rather than directly beneath the head 114. The head 114 can continue to travel along the stroke toward a center of the disk at a load velocity until the position of the head 114 can be sampled as the next servo wedge passes beneath the head 114. The sampling error and load velocity can result in a variation in the location of the acquire track 540 of several hundred tracks. There are myriad different phenomena that can cause an acquire track 540 to be an undesirable distance from the ramp 130 and/or from the OD.

A first user track 542 can define an outer boundary of a data region and can be assigned to a track located some distance closer to the ID than an average acquire track 540. The first user track 542 typically (though not necessarily) contains critical system information, and the distance between the first user track 542 and the average acquire track 540 can act as a buffer so that the head 114 can avoid reading or writing to the disk 108 while traversing a portion of the disk 108 surface possibly damaged by sporadic contact during frequent loading of the slider 228 from the ramp 130 to the disk 108. As mentioned above, contact between the slider 228 and the disk 108 typically occurs at the touch point 534 where the suspension lift tab 232 leaves the ramp 130. A conservative buffer locates the first user track 542 about one-and-a half widths of the slider 228 away from the average acquire track 540 (as shown in FIG. 5). The average acquire track 540 estimates the location of the touch-point 534 for purposes of setting the first user track 542; however, as described above, the average acquire track 542 is likely located some undesirable distance from the touch-point 534. Therefore, the buffer is likely farther from the OD than is necessary to avoid defects. Setting the first-user track 542 based on the average acquire track 540 can reduce the disk 108 surface available for user data. Typically, a manufacturer will increase the density of the tracks written to the disk 108 surface to produce a hard disk drive 100 having a targeted capacity. An increase in track density can negatively impact hard disk drive 100 performance, resulting, for example, in a reduction in manufacturing tolerance for the width of the head 114, or a degradation in the performance of the servo system.

Figure 6A:
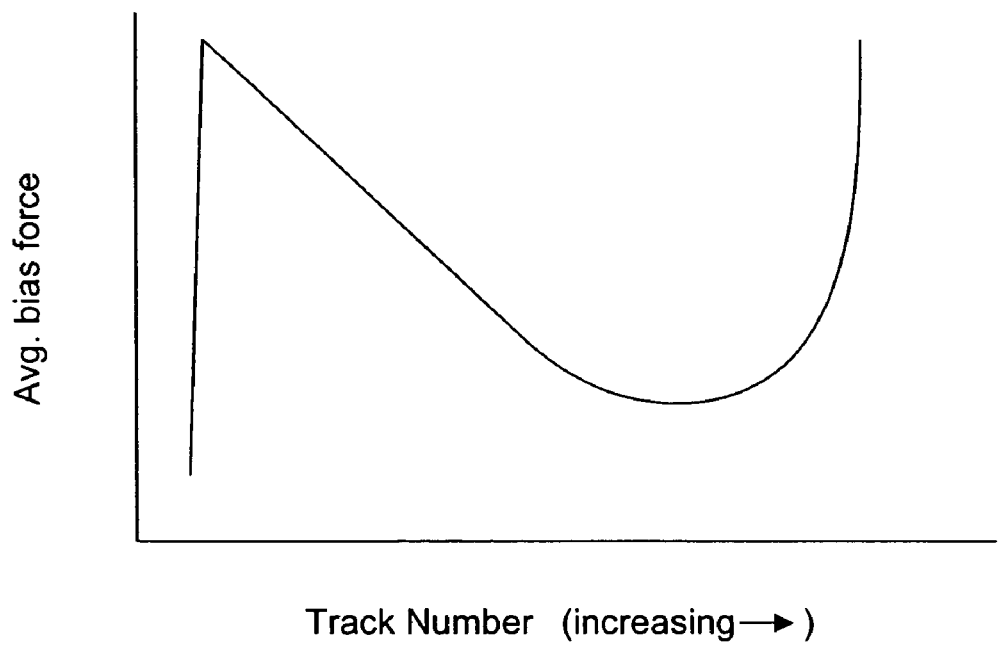
FIG. 6A is an exemplary plot of a measurement of average bias force as a function of track number.

The touch-point 534 can be more accurately located for defining a first-user track 542 by monitoring an average bias force as the actuator 110 contacts the ramp 130, and detecting a particular change in the average bias. Electrical bias forces can result from voltage and current offsets in the electrical circuitry and can act on a rotary actuator 110 as a function of the radial position of the head 114 on the disk 108. An average bias force can be measured by the servo system as the head 114 reads servo wedges passing beneath the head 114. The servo system can seek the OD and measure the average control effort (i.e. bias force) required as the head 114 changes radial position. FIG. 6A is a sample plot of average bias force as a function of track number, where the origin represents the OD (rather than a first user track) and an increase in track number indicates nearness to the ID. As the head 114 is pivoted toward the OD from the ID (moving from right to left on the plot), the average bias force initially drops, and then gradually and steadily increases. Where the lift tab 232 contacts the ramp 130, a dramatic drop in average bias force can be measured.

Figure 6B:
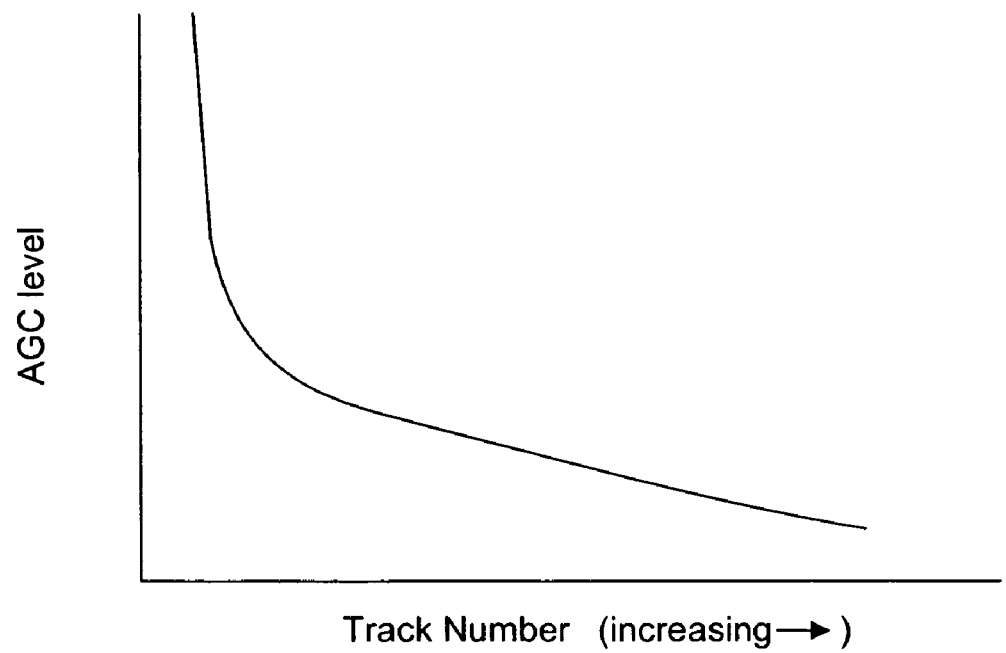
FIG. 6B is an exemplary plot of a measurement of AGC level as a function of track number.

Alternatively, the touch-point 534 can be located by monitoring gain adjustment in an automatic gain control (AGC) circuit associated with the read/write channel 442 and detecting a particular change in the gain adjustment. The AGC circuit adjusts the amplitude of a signal received from the current preamplifier 444 within desirable boundaries when converting an analog signal into digital form. FIG. 6B is a sample plot of AGC level as a function of track number, where the origin represents the OD (rather than a first user track) and an increase in track number indicates nearness to the ID. As the head 114 is pivoted toward the OD from the ID (moving from right to left on the plot), the AGC level increases. An increase in AGC level toward the OD can be attributed to degradation in the written signal as the domains of magnetization become less defined. Where the lift tab 232 contacts the ramp 130, a sharp rise in AGC level can be detected.

Figure 7:
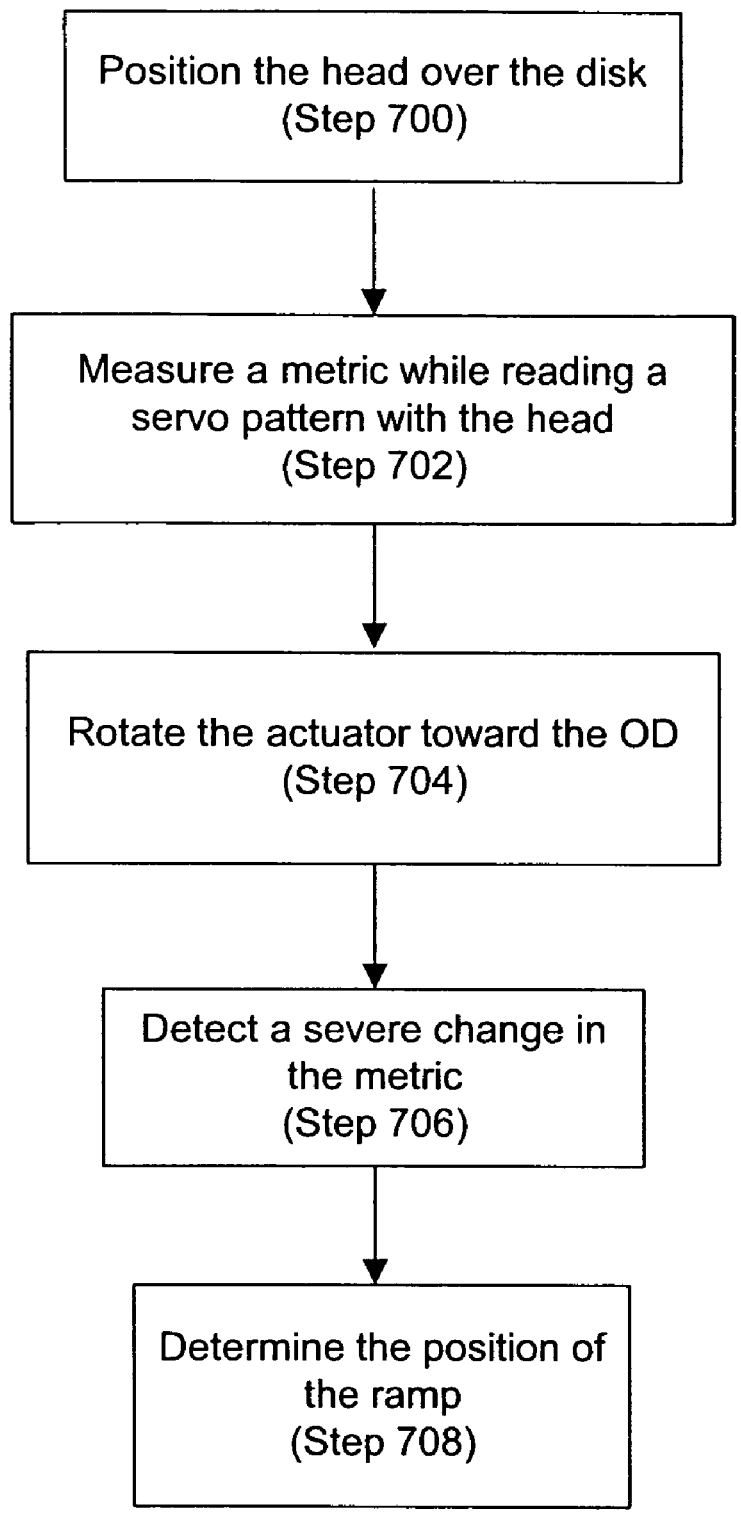
FIG. 7 is a flowchart of a method in accordance with one embodiment of the present invention to determine the position of a ramp relative to an actuator.

A method in accordance with an embodiment of the present invention can include determining the position of a ramp 130 relative to an actuator 110 by monitoring and detecting a change in a metric, which metric changes as the actuator 110 contacts the ramp 130. Such a metric can include an average bias force. As shown in FIG. 7, the position of the ramp 130 relative to the actuator 110 can be determined by initially positioning the head 114 over the disk 108 surface (Step 700), for example by loading the head 114 onto the disk 108 from the ramp 130. The head 114 can determine position relative to a given track by reading servo patterns arranged on the disk 108 surface in servo wedges that pass beneath the head 114 as the disk rotates. An average bias force can be measured while reading the servo pattern (Step 702). The position of the ramp 130 can be determined by pivoting the rotary actuator 110 such that the head 114 moves toward the OD along the stroke (Step 704). As the lift tab 534 (or some other portion of the HSA 222) contacts the ramp 130, a change in the average bias force deviating beyond a given tolerance can be detected (Step 706), locating the ramp 130 relative to the actuator 110. As shown in FIG. 6A, such a deviation includes a severe drop. In alternative embodiments, an AGC level can be measured by the servo system. The location of the ramp 130 can be detected from a deviation in AGC level beyond a given tolerance. As shown in FIG. 6B, such a deviation includes a sharp increase in AGC level. In still other embodiments, deviation in some other measurable metric known to result from contact between the HSA 222 and the ramp 130, can indicate the location of the ramp 130. Methods and system in accordance with the present invention are meant to apply to any measurable change resulting from contact between the HSA 222 and the ramp 130.

The position of the ramp 130 can be determined relative to the ID by pivoting the rotary actuator 130 such that the head 114 moves toward the ID. A number of cycles can be monitored until the actuator contacts an ID crash stop. The number of cycles measured between the ramp 130 and the ID crash stop can define the position of the ramp 130 relative to the ID and the portion of the disk 108 surface available for storing user data.

Figure 8:
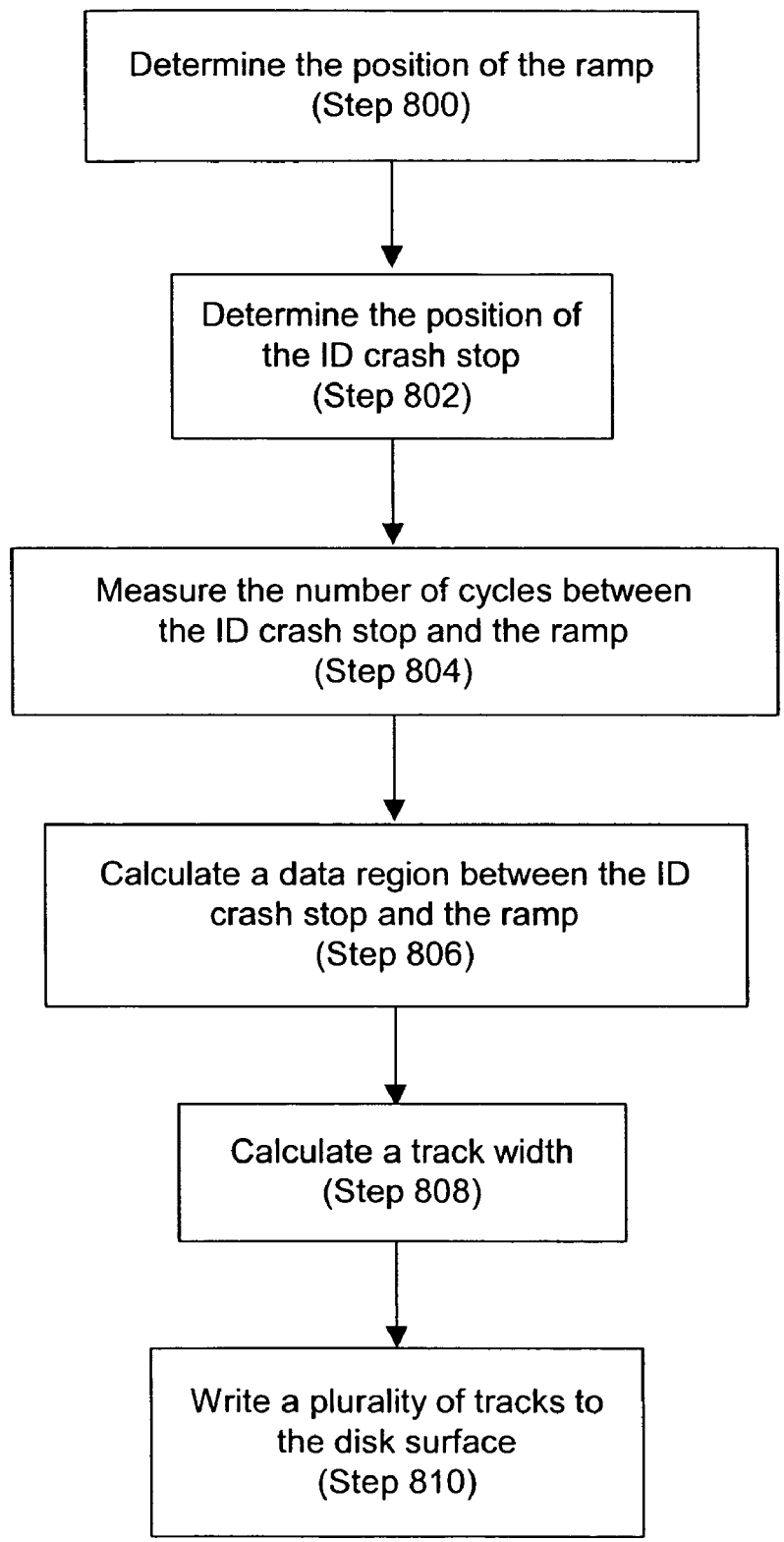
FIG. 8 is a flowchart of a method in accordance with one embodiment of the present invention to calculate a data region for a disk.
Figure 9:
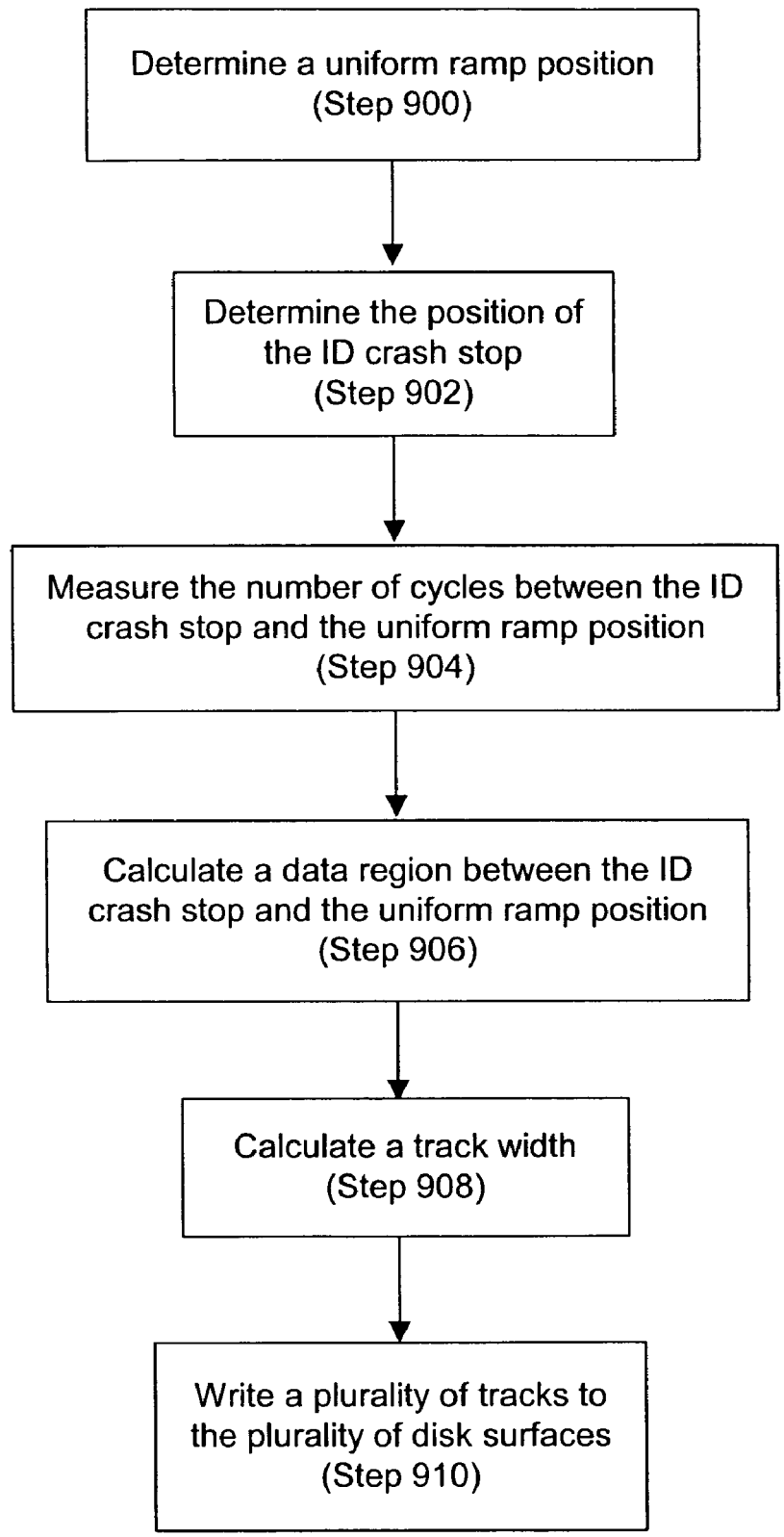
FIG. 9 is a flowchart of a method in accordance with one embodiment of the present invention to calculate a data region for a plurality of disks.

Methods in accordance with the present invention can further be applied to self servo write a disk 108 surface. As shown in FIG. 8, once the position of the ramp 130 is determined relative to the actuator 110 (Step 800) the actuator 110 can pivot toward the ID until the actuator 110 contacts the ID crash stop (Step 802). As described above, the number of cycles between the ramp 130 and ID crash stop can be measured as the head 114 travels from the ramp 130 to the ID crash stop (Step 804). The maximum size of the data region can be determined by calculating the disk 108 surface available by first calculating the distance between the ramp 130 and the ID crash stop, and deducting from the distance a first buffer between the ramp 130 and the first user track 254, and optionally a second buffer between the ID crash stop and a final track (Step 806). Once the maximum disk 108 surface available for the data region is calculated, a width can be calculated for each track given a target capacity (Step 808). Alternatively the hard disk drive 100 capacity can be maximized for a given track density. A plurality of servo wedges can be written to the disk 108 surface starting some small distance from the ramp 130 (Step 810). The first user track 542 can be assigned to a track located a distance from the ramp 130 equivalent to the first buffer.

In one embodiment, the position of the ramp 130 relative to the first user track 542 can be verified prior to completely self servo writing the disk 108. For example, a plurality of servo wedges can be written to a portion of the data region, the first user track 542 can then be assigned, and the servo system can again estimate the position of the ramp 130 as described above. Once the position of the ramp 130 is determined, the head 114 can be positioned at the first user track 542 and a new distance calculated between the ramp 130 and the first user track 542 can be compared with the first buffer. In some embodiments, the distance between the ramp 130 and ID crash stop can be verified. In still other embodiments, the entire disk 108 can be self-servo written once the data track width is calculated. One of ordinary skill in the art can appreciate the myriad different verification steps and sequences that can be applied (or not applied) during self-servo writing of a disk 108 once the position of the ramp 130 is known. The above examples are not meant to be exhaustive.

Methods in accordance with the present invention can further be applied to self servo write a plurality of disks 108 or a plurality of disk 108 surfaces connected with a spindle motor 112. Where the actuator 110 is connected with a plurality of heads 114, a position of the ramps 130 can be determined relative to the actuator 110 by positioning the plurality of heads 114 over the respective disk 108 surfaces and reading servo wedges on the disk 108 surfaces. The actuator 110 can be pivoted toward the OD of the plurality of disks 108 surfaces as a metric (e.g. an average bias force and/or AGC level) is measured, until contact between at least one of a plurality of HSAs 222 connected with the actuator and a corresponding ramp 130 is detected. In one embodiment, the position of the corresponding ramp 130 relative to the actuator 110 is assigned as a position of each of the ramps 130 relative to the actuator 110 (a uniform ramp position) for purposes of determining the first user track 542 and data region for each of the disk 108 surfaces (Step 900). Once the uniform ramp position is determined relative to the actuator 110, the actuator 110 can be pivoted toward the ID until the actuator 110 contacts the ID crash stop (Step 902).

As described above, the number of cycles between the uniform ramp position and ID crash stop can be measured as the head 114 travels from the uniform ramp position to the ID crash stop (Step 904). The maximum size of the data regions can be determined by calculating the disk 108 surface available by first calculating the distance between the uniform ramp position and the ID crash stop, and deducting from the distance a first buffer between the uniform ramp position and the first user tracks 254, and optionally a second buffer between the ID crash stop and a final tracks (Step 906). Once the maximum disk 108 surface available for the data regions is calculated, a width can be calculated for each track given a target capacity (Step 908). Alternatively, a number of tracks can be calculated for a given track density. A plurality of servo wedges can be written to one or more of the plurality of disk 108 surfaces starting some small distance from the uniform ramp position (Step 910). The first user track 542 can be assigned to a track located a distance from the uniform ramp position equivalent to the first buffer for each disk 108 surface.

As described above, the uniform ramp position relative to the first user track 542 can be verified prior to completely self servo writing the plurality of disk 108 surfaces. For example, a plurality of servo wedges can be written to a portion of one or more of the data regions, one or more of the first user tracks 542 can then be assigned, and the servo system can again estimate the uniform ramp position as described above. Once the uniform ramp position is determined, the head 114 can be positioned at the first user track 542 for at least one of the disk 108 surfaces, and a new distance calculated between the uniform ramp position and the first user track 542 can be compared with the first buffer. In other embodiments, the plurality of disks 108 can be completely self-servo written once the data track width is calculated. One of ordinary skill in the art can appreciate the myriad different verification steps and sequences that can be applied (or not applied) during self-servo writing of a plurality of disks 108 once the uniform ramp position is known. The above examples are not meant to be exhaustive.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

The invention claimed is:

1. A method to determine a location of a ramp relative to an actuator in a data storage device, comprising:
    positioning a head connected with said actuator over a rotating media such that said actuator does not contact said ramp;
    reading a servo pattern disposed on said rotating media using said head in communication with a servo system;
    measuring a metric of said servo system while reading the servo pattern;
    adjusting said actuator such that the head moves toward an outer edge of the rotating media;
    detecting a change in the metric, which metric changes as the actuator contacts the ramp.

2. The method of claim 1, wherein the metric is a bias force.

3. The method of claim 1, wherein the metric is an automatic gain control level.

4. The method of claim 2, wherein the change is a severe drop.

5. The method of claim 3, wherein the change is a sharp increase.

6. The method of claim 1, wherein positioning the head further comprises loading the head to the rotating media by removing said actuator from contact with said ramp.

7. The method of claim 6, further comprising acquiring a track.

8. The method of claim 1, wherein the rotating media is a disk.

9. The method of claim 1, wherein the actuator is a rotary actuator.

10. The method of claim 1, wherein the head is a magneto-resistive head.

11. The method of claim 1, further comprising determining a data region within a stroke of the actuator; and
wherein determining the data region includes:
adjusting said actuator toward a center of said rotating media so that said actuator contacts an inner hard stop,
measuring a plurality of cycles as said head moves from the inner hard stop toward an outer edge of said rotating media,
determining a number of cycles measured between the inner hard stop and the location of the ramp, and
determining the data region based on the number of cycles measured.

12. The method of claim 11, wherein the data region begins a first buffer distance toward the center of the rotating media from the position of the ramp, and ends a second buffer distance toward the outer edge of the rotating media from the inner crash stop.

13. The method of claim 11, further comprising:
adjusting said actuator such that said head detects a mark on said rotating media;
determining a first number of cycles measured between the mark and the position of the ramp;
adjusting said actuator such that said head moves toward an outer edge of said rotating media;
measuring a plurality of cycles as said head moves from the inner hard stop toward an outer edge of said rotating media;
determining a position of the ramp by detecting a severe change in the metric;
determining a second number of cycles measured between the mark and the position of the ramp;
comparing the first number of cycles with the second number of cycles; and
determining the data region based on the number of cycles measured.

14. The method of claim 1, further comprising adjusting a location of a ramp during manufacturing of the data storage device; and
wherein adjusting the location of the ramp includes:
adjusting said actuator toward a center of said rotating media so that said actuator contacts an inner hard stop,
measuring a plurality of cycles as said head moves from the inner hard stop toward an outer edge of said rotating media,
determining a number of cycles measured between the inner hard stop and the location of the ramp, and comparing the number of cycles measured to a desired number of cycles;
determining an adjustment distance based on the difference between the number of cycles measured and the desired number of cycles; and
repositioning said ramp by the adjustment distance.

15. A method to self-servo write a rotatable media in a data storage device having a ramp and an actuator connected with a head, comprising:
positioning said head over said rotating media such that said actuator does not contact said ramp;
reading a servo pattern on said rotating media using said head;
measuring a metric while reading the servo pattern;
moving said actuator toward a center of said rotating media so that said actuator contacts an inner hard stop;
moving said actuator such that said head moves toward an outer edge of said rotating media;
measuring a plurality of cycles as said head moves from the inner hard stop toward an outer edge of said rotating media;
determining a position of the ramp by detecting a change in a metric, which metric changes as the actuator contacts the ramp;
determining a number of cycles measured between the inner hard stop and the position of the ramp;
determining a desirable data region based on the number of cycles measured; and
writing a set of tracks on said rotating media using said head.

16. The method of claim 15, wherein the metric is a bias force.

17. The method of claim 16, wherein the change is a severe drop.

18. The method of claim 15, wherein the metric is an automatic gain control level.

19. The method of claim 18, wherein the change is a sharp increase.

20. The method of claim 15, wherein the data region begins a first buffer distance toward the center of the rotating media from the position of the ramp, and ends a second buffer distance toward the outer edge of the rotating media from the inner crash stop.

21. The method of claim 15, wherein the servo pattern is one of a media written pattern and a printed media pattern.

22. The method of claim 15, wherein the set of tracks is written within the data region.

23. The method of claim 22, wherein the set of tracks is predefined so that a size of the data region defines a track density.

24. The method of claim 15, wherein the set of tracks is written between the position of said ramp and the data region, and a portion of the desirable data region.

25. The method of claim 24, further comprising:
unloading said head from close proximity to said rotating media so that said actuator contacts said ramp;
loading said head onto said rotating media;
acquiring a track;
reading the servo pattern on said rotating media using said head;
measuring the metric while reading the servo pattern;
adjusting said actuator such that said head moves toward an outer edge of said rotating media;
measuring a plurality of cycles as said head moves from the acquired track toward an outer edge of said rotating media;

determining the position of the ramp by detecting a change in a metric, which metric changes as the actuator contacts the ramp, determining the number of cycles measured between the acquired track and the position of the ramp;

determining a first user track; and writing a final set of tracks on said rotating media using said head.

26. The method of claim 25, wherein the final set of tracks is written between the position of said ramp and the data region, and a portion of the data region.

27. A method to determine a data stroke for a rotatable media in a data storage device having an actuator and a ramp, the rotatable media having a pattern disposed on a surface of the rotatable media, the method comprising:

self-servo writing a servo pattern on the surface based on the pattern;

wherein the self-servo writing includes removing eccentricity from the arrangement of the servo pattern on the surface;

positioning a head connected with said actuator over the rotatable media such that said actuator does not contact said ramp;

reading the servo pattern disposed on said rotating media using said head;

measuring a metric while reading the servo pattern;

adjusting said actuator such that the head moves toward an outer edge of the rotating media;

detecting a change in the metric, which metric changes as the actuator contacts the ramp;

adjusting said actuator such that the head moves toward an inner diameter of the rotating media;

detecting a change in the metric, which metric changes as the actuator contacts an inner crash stop; and determining the data stroke based on a location of the ramp and a location of the inner crash stop.

* * * * *